(12) United States Patent
Nebel et al.

(10) Patent No.: US 8,387,007 B2
(45) Date of Patent: Feb. 26, 2013

(54) SCRIPTING BRIDGE

(75) Inventors: Christopher Nebel, San Jose, CA (US); William Bumgarner, San Jose, CA (US); Adam Julian Goldstein, South Orange, NJ (US)

(73) Assignee: Apple Inc., Cupertino, CA (US)

( * ) Notice: Subject to any disclaimer, the term of this patent is extended or adjusted under 35 U.S.C. 154(b) by 1560 days.

(21) Appl. No.: 11/760,335

(22) Filed: Jun. 8, 2007

(65) Prior Publication Data

US 2008/0307401 A1    Dec. 11, 2008

(51) Int. Cl.
*G06F 9/44*    (2006.01)

(52) U.S. Cl. ........................................ 717/115

(58) Field of Classification Search .................. 709/223, 709/207; 705/39, 323; 719/329; 715/780, 715/201, 758; 358/1.18; 717/115
See application file for complete search history.

(56) References Cited

U.S. PATENT DOCUMENTS

2004/0243682 A1 * 12/2004 Markki et al. ................ 709/207

OTHER PUBLICATIONS

Benjamin Waldie, "AppleScript Essentials", User interface Scripting: vol. 21, Iss. 6, 2005, p. 1-5 <UserInterf_2005.pdf>.*
Apple Computer, "Apple Event Manager Reference", Inside Mac OS X: Chapter 1, Feb. 2003, pp. 1-288 <ApEv_Ref03.pdf>.*
SBA Class reference: SBApplication, SBElementary, SBOject, SBApplicationDelegate protocol, Apple inc. May 29, 2007—p. 1-21 <SBFrameWRef.pdf>.*
AppleSBF, "Scripting Bridge Framework Reference", Developer: May 29, 2007, p. 1-21 <SBFrameWRef.pdf >.*

* cited by examiner

*Primary Examiner* — Tuan A Vu
(74) *Attorney, Agent, or Firm* — Novak Druce Connolly Bove + Quigg LLP

(57)    ABSTRACT

A scripting bridge allows a developer to automatically build glue classes to access a scriptable application with standard method calls written in a language such as Objective-C. The Objective-C code sends properly formed Apple events automatically (or events according to some other event protocol), so that the developer is not required to have any knowledge of the scripting language of the target application. Classes can be created dynamically at run-time, including dynamic creation of methods within those classes. Lazy evaluation is employed to avoid unnecessary inter-process communication traffic.
The present invention provides a straightforward model for controlling scriptable applications that can result in code that is significantly faster and more efficient than prior art methods.

40 Claims, 4 Drawing Sheets

SCRIPTING BRIDGE

FIELD OF THE INVENTION

The present invention relates to code translation, and more particularly to methods and systems for accessing a scriptable application with standard method calls.

DESCRIPTION OF THE RELATED ART

Scriptable applications provide an easy way for software developers to customize the operation of software applications. A scriptable application is an application whose operation can be automated using a script. For example, many applications written for the Mac OS® operating system are capable of responding to script-based commands written in AppleScript®. AppleScript® talks to applications using the well-known Apple Event Interprocess Messaging Protocol. Apple events are commonly used by an application to send and receive information from other applications.

In some cases, developers wish to control the operation of scriptable applications from an application that is written in Objective-C or some other compiled or interpreted language. Some application programming environments provide tools for executing scripts to control scriptable applications. For example, the Cocoa application programming environment provides an NSAppleScript class that provides a mechanism for running an AppleScript® script from within a Cocoa application. However, in order to use NSAppleScript, a developer must write the AppleScript® script and then invoke the NSAppleScript class to execute the script. This technique has several disadvantages: 1) it can be burdensome; 2) it requires the developer to be familiar with AppleScript® and the target application's Apple events model; and 3) it results in slow, inefficient code.

Alternatively, a developer can use NSAppleEventDescriptor to manually send and receive Apple events from within the Objective-C code. This class allows developers to construct Apple events or extract information from them. Again, such a technique can be burdensome and inefficient.

What is needed, therefore, is a technique for allowing software developers to control script-based applications from within a compiled object-oriented programming environment such as Objective-C, and/or from within other compiled or interpreted languages. What is further needed is a technique that does not overly burden the developer with a requirement to write script-specific code manage individual events. What is further needed is a technique that results in efficient code and avoids or minimizes the disadvantages of prior art techniques.

SUMMARY OF THE INVENTION

The present invention, referred to herein as a "scripting bridge", allows a developer to automatically build glue classes to access a scriptable application with standard method calls written in a language such as Objective-C. The Objective-C code sends properly formed Apple events automatically (or events according to some other event protocol), so that the developer is not required to have any knowledge of the scripting language of the target application. For example, using the techniques of the present invention, a developer could get the name of the current iTunes® track with the following line of code:
NSString*currentTrackName=[[iTunes currentTrack] name];

In one embodiment, the present invention uses native Cocoa data types, such as NSString and NSArray, so as to reduce the amount of code required and to improve speed.

The present invention provides a straightforward model for controlling scriptable applications that can result in code that is significantly faster and more efficient than prior art methods. Furthermore, the scripting bridge of the present invention allows a developer to control scriptable applications without having detailed knowledge of the target application's scripting language.

The present invention allows the developer to use standard memory management within the Cocoa application programming environment, without having to manually allocate and free space for Apple events or other script-based resources. The present invention also requires less code than using NSAppleEventDescriptor or direct calls. The present invention also is able to check for syntax errors at compile time by comparing elements of an automatically generated header against the original definition, and flagging any errors.

The present invention can be used, for example, as a framework for facilitating direct control of one Cocoa application from another. The invention further allows other applications to control scriptable applications. For example, code written in Ruby (via RubyCocoa) or Python (via PyObjC) can control scriptable applications using the present invention, giving those languages the same advantages enjoyed by AppleScript®.

In this manner, the present invention provides a mechanism for controlling scriptable applications in a seamless manner that can integrate with existing Objective-C code, and/or with compiled or interpreted code written in other languages.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

The present invention allows a developer to automatically build glue classes to access a scriptable application with standard method calls written in a language such as Objective-C. The Objective-C code sends properly formed Apple events automatically (or events according to some other event protocol), so that the developer is not required to have any knowledge of the scripting language of the target application.

In one embodiment, the present invention uses a "scripting bridge", which is a system framework that can be included with an operating system such as Mac OS® X. In one embodiment, the following classes are defined:

SBApplication: a target application that the developer wishes to communicate with, for example iTunes®;

SBObject: an object within the target application—for example, an iTunes® track;

SBElementArray: a collection of SBObject instances—for example, a collection of all tracks in an iTunes® playlist.

One skilled in the art will recognize that the particular framework, structure, classes, and arrangement thereof are merely exemplary, and that many variations are possible without departing from the essential characteristics of the present invention.

Using the techniques of the present invention, the developer can avoid dealing with most of these classes directly, instead working with subclasses in the generated glue classes. For example, for an Objective-C application that is intended to control the iTunes® application, the developer might use classes such as iTunesApplication (which inherits from SBApplication) and iTunesTrack (which inherits from SBObject). In one embodiment, these application-specific subclasses are not included in the scripting bridge framework itself, but are created at run-time.

Figure 1:
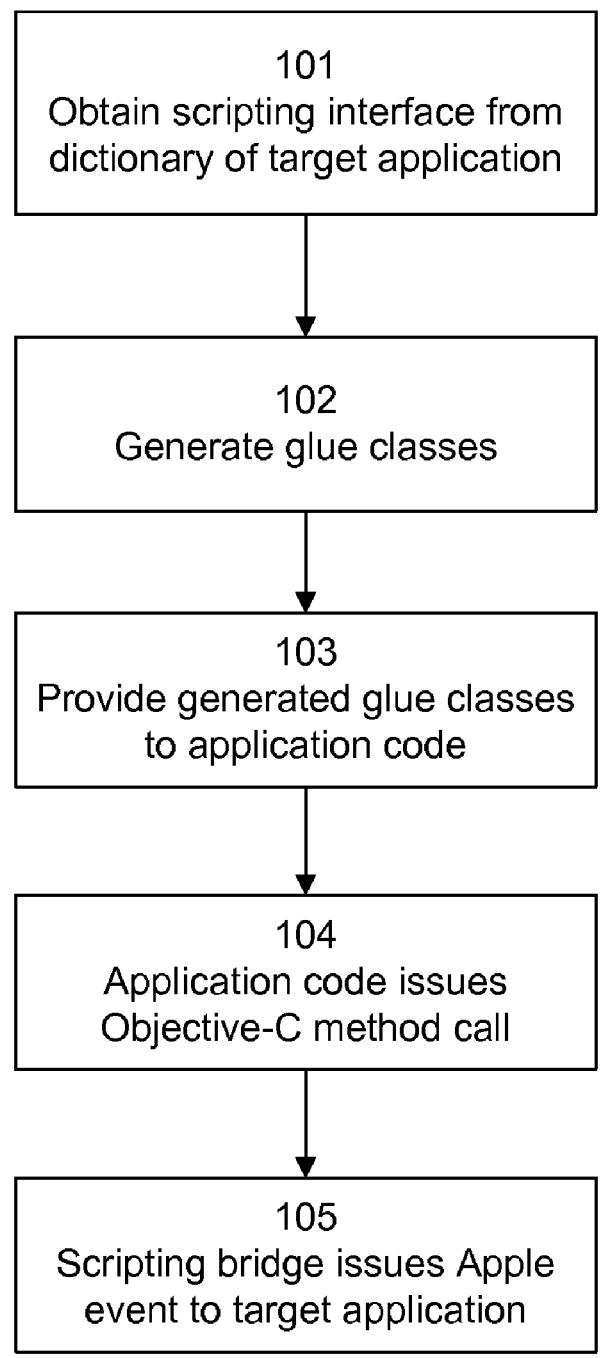
FIG. 1 is a flowchart depicting a method for implementing the present invention according to one embodiment.
Figure 2:
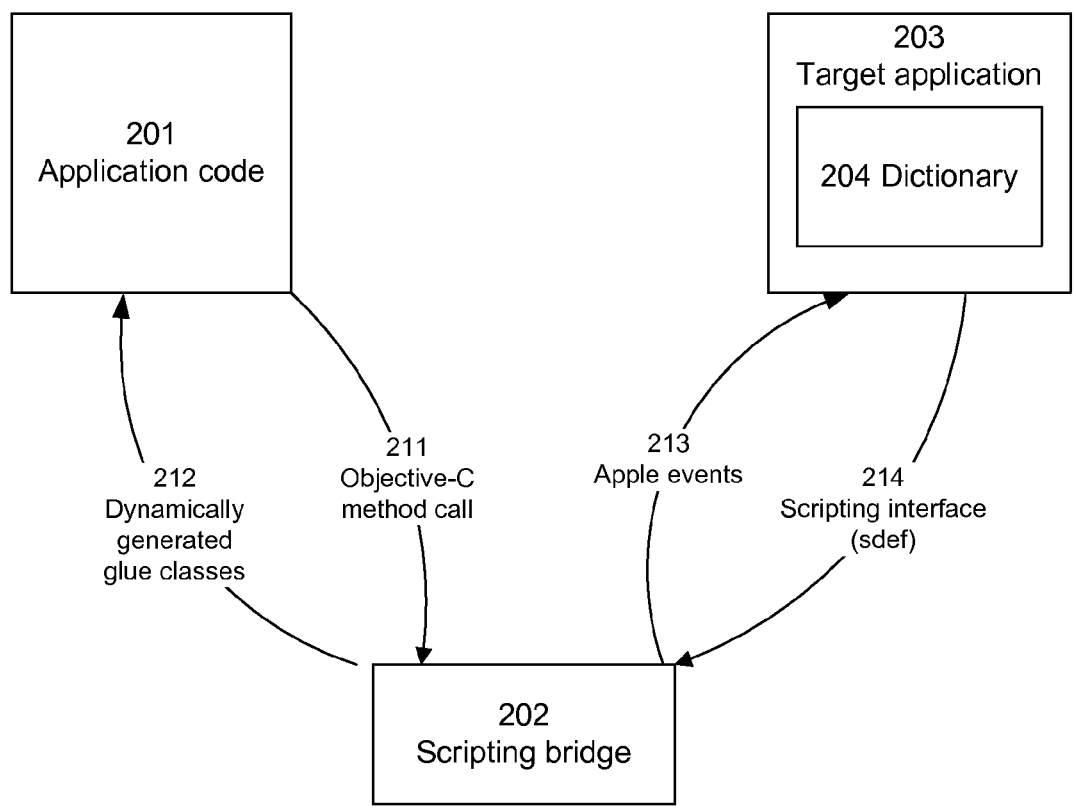
FIG. 2 is a block diagram depicting an architecture for implementing the present invention according to one embodiment, wherein glue classes are generated dynamically at run time.

Referring now to FIG. 1, there is shown a flowchart depicting a method for implementing the present invention according to one embodiment. Referring also to FIG. 2, there is shown a block diagram depicting an architecture for implementing the present invention according to one embodiment. Application code 201 is the application being written by the developer, for example in Objective-C or another compiled or interpreted language. Target application 203 is the scriptable application that the developer wishes to control. In one embodiment, scripting bridge 202 is a software module that implements the functionality of the present invention.

Figure 4:
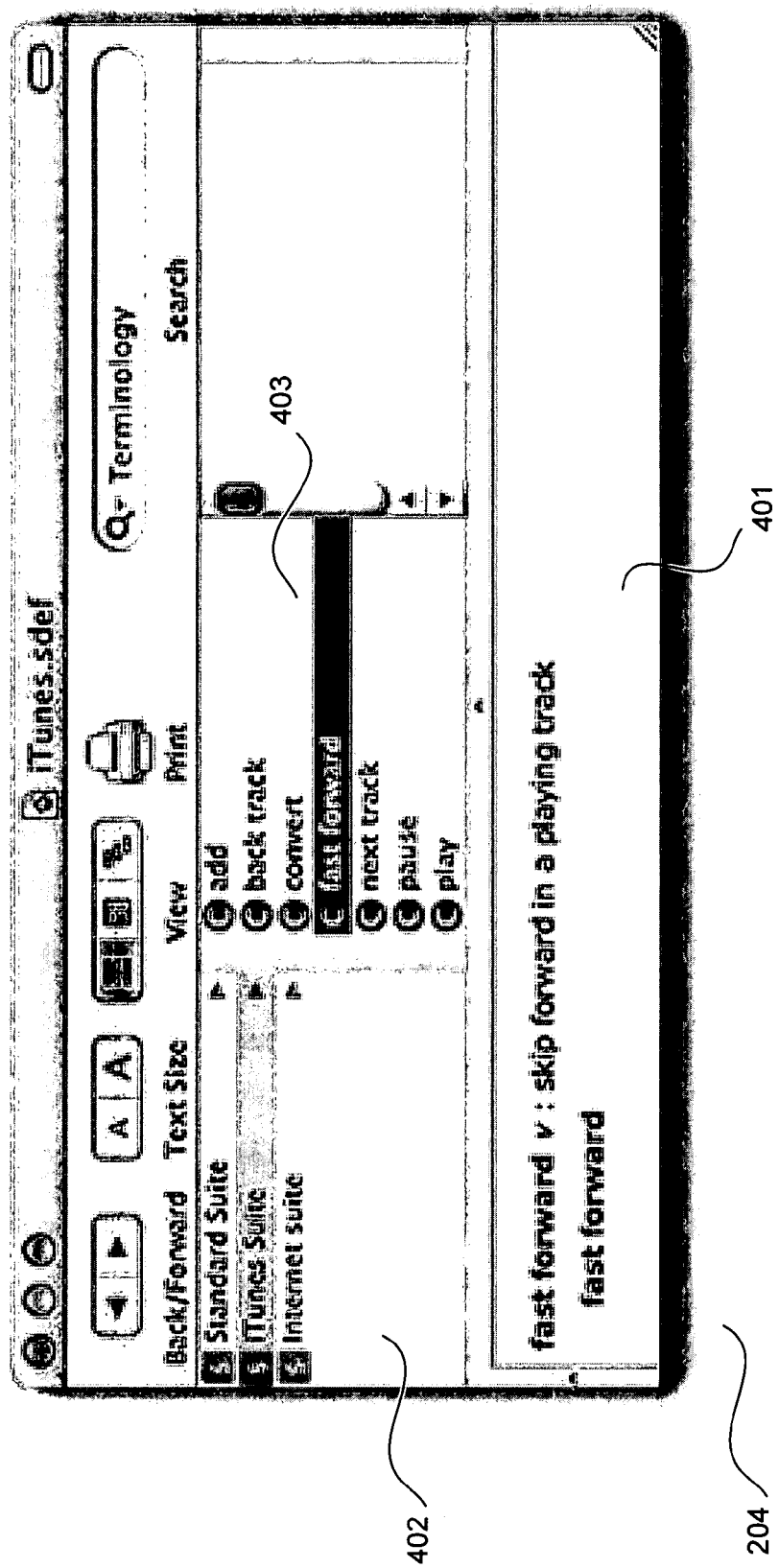
FIG. 4 is an example of a dictionary for the iTunes® application.

Scripting bridge 202 generates glue classes for invoking scripts to control target application 203. In one embodiment, such glue classes are generated by obtaining 101 scripting interface 214, or sdef (scripting definition) from dictionary 204 of target application 203. Dictionary 204 specifies the terms that are understood by target application 203. Referring now briefly to FIG. 4, there is shown an example of dictionary 204 for the iTunes® application. Category list 402 provides several categories of terms. Term list 403 indicates dictionary terms that are available within the selected category. Definition 401 provides explanatory text for a selected item in list 403.

Once scripting bridge 202 has generated 102 its glue classes, it provides 103 the generated glue classes 212 to application code 201. These dynamically generated glue classes 212 (collectively referred to as glue code) are used to facilitate access to scripting commands from directly within application code 201. Thus, based on dictionary 204, scripting bridge 202 creates and provides dynamically generated glue classes 212 that are included in the code environment (such as Objective-C) in which the developer is working.

Once the generated glue classes 212 have been provided 103, application code 201 can specify an operation to be performed by target application 203 by issuing 104 a method call 211 in Objective-C (or whatever language is being used for application code 201). Based on the method call, scripting bridge 202 issues 105 an Apple event 213 to target application 203, which interprets and executes the specified function as it would any scripted operation.

The generated classes 212 include Objective-C classes that can be used to control the target scriptable application. In one embodiment, the classes include the full set of code for controlling the target application. In another embodiment, the code is optimized so that only that code that is needed is generated and included.

In one embodiment, as described above the glue classes are generated dynamically and included at run time; this can result in a smaller, more efficient result. Run-time generation of the glue classes also facilitates the use of the present invention while coding in a third language such as Python or Ruby. In such a situation, another bridge translates code from Python or Ruby into an Objective-C class, and the scripting bridge then provides the translation from Objective-C to the scriptable application. Furthermore, run-time generation avoids the need to include extra code for the scripting bridge within the application being coded. Rather, the developer need only invoke an Objective-C method that is already present in order to invoke the scripting bridge and thereby exercise control over the target application.

Figure 3:
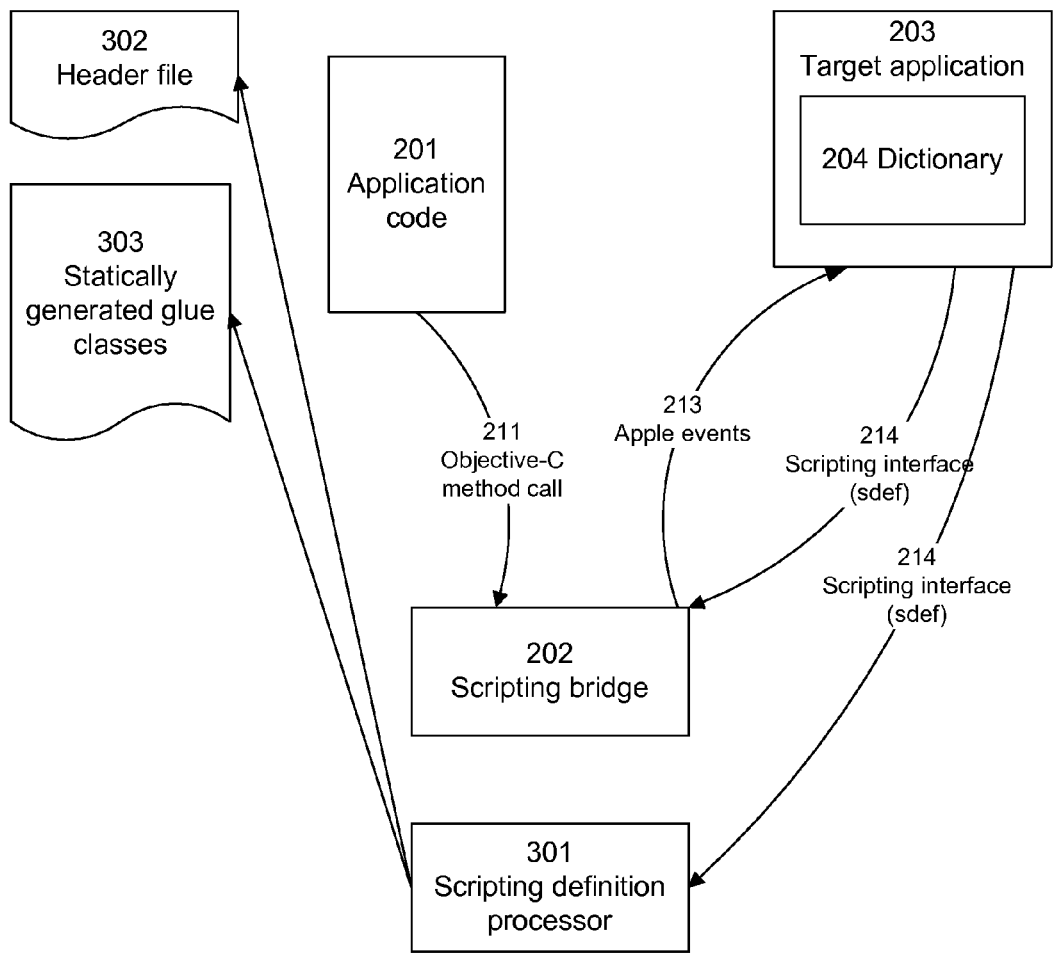
FIG. 3 is a block diagram depicting an alternative architecture for implementing the present invention according to one embodiment, wherein glue classes are generated statically at build time.

Alternatively, the glue classes are generated in advance, for example at build time. This removes the need to generate glue classes at run time. Referring now to FIG. 3, there is shown an alternative architecture for build-time generation of glue classes. The architecture of FIG. 3 operates substantially as described above, with the addition of scripting definition processor (sdp) 301. sdp 301 is an optional component that can create statically generated glue classes 303 at build time, so that there is no need for classes to be generated at run time. In one embodiment, the sdp-generated files are attached to application code 201, since they effectively are part of the application code.

In addition, sdp 301 can generate one or more header files 302 at build time. These header files 302, or ".h" files, include declarations for statically generated glue classes 303; header files 302 can be included in application code 201 so as to properly declare the generated classes before they appear in the code. Header files 302 are optional because in most implementations the Objective-C compiler can assume declarations on the fly if they are not present. In such an embodiment, it may be useful to provide a header file for inclusion in code files so that relevant methods are properly declared before they appear in the code.

In one embodiment, header file is useful for checking for syntax errors at compile time. The generated header file for the target application specifies the API (application programming interface) for that application. The compiler can then use that header to check any uses of the API against the original definition, and flag any errors.

Referring again to FIG. 4, where an example of dictionary 204 for the iTunes® application is shown, the following is an example of a header file 302 that scripting definition processor 301 might generate based on the iTunes® dictionary 204:

```
@interface iTunesApplication : SBApplication {
}
...
- (void) fastForward; // skip forward in a playing track
- (void) nextTrack;   // advance to the next track in
the current playlist
- (void) pause;       // pause playback
...
@end
```

In one embodiment, this header file 302 would be generated in response to the developer invoking sdef (scripting definition, also referred to as scripting interface) and sdp (scripting definition processor) tools in a command such as:

```
    sdef pathToApplication | sdp -fh --basename application
Name
```

This command line uses sdef to get the scripting definition from the application. If the application does not contain an actual sdef, but does contain scripting information in another format (such as aete or Cocoa script suite), the tool translates that information into the sdef format. The command pipes the output of the sdef tool to sdp (scripting definition processor) to generate the corresponding header file.

An example of the command line for an iTunes® application is:

```
    sdef /Applications/iTunes.app | sdp -fm --basename
iTunes
```

This command produces header file iTunes.h in the current directory; the header contains declarations for the iTunes® classes. The developer can then include this header file in the project being written. The developer links the project with a framework specifically associated with scripting bridge 202.

Generating the header does not cause any implementations for target application classes to be generated. Rather, scripting bridge 202 generates these instances of the classes on the fly, i.e., at run time.

To start communicating with the target application (iTunes® in this example), the developer tells scripting bridge 202 to create the application class:

```
    Class iTunesApplicationClass = [SBApplication class-
ForApplicationWithBundleIdentifier:@"com.apple.iTunes"];
```

This locates the target application 203 given its bundle identifier, reads its scripting dictionary 204, and creates Objective-C classes for all the classes defined there. Class and command definitions in the sdef are mapped to class and method definitions in Objective-C. Given those definitions, scripting bridge 202 uses calls defined by the Objective-C runtime system to synthesize actual implementations. Then the developer creates an instance:

```
    iTunesApplication *iTunes = [[iTunesApplicationClass
alloc] init];
```

This locates target application 203 using the same method used to create the class, in this case, by bundle identifier.

Then, the developer can communicate with target application 203 using methods on the resulting object.

Although the above description is set forth in the context of iTunes® as the target application 203, one skilled in the art will recognize that similar techniques can be used for any application that has a dictionary 204.

In one embodiment, when sdp 301 generates header file 302, it automatically adds a comment to each method declaration, taken from the corresponding term in the target application dictionary 204. For example, in a header file 302 generated for a Finder application 203, the following declaration might appear for the FinderApplication class:

-(void)empty; // Empty the trash

In one embodiment, application-specific classes return data in a form that is useful to the developer. For example, the Finder's-startupDisk method returns a FinderDisk object, and iTunes®'-currentTrack method returns an iTunesTrack object. When the developer requests that an object provide its name using the -name method, the result is returned as an instance of NSString. Similarly, the developer can get and set properties of an application in the same way he or she would perform such operations for instance variables inside application code 201, for example using methods such as -ignoresPrivileges and -setIgnoresPrivileges. The present invention provides this consistency and ease of operation so as to improve the process of incorporating glue classes into existing projects.

In one embodiment, the scripting bridge of the present invention uses a technique called lazy evaluation in order to further increase efficiency. Because sending Apple events can be expensive, the scripting bridge 202 of the present invention is configured so that it avoids sending Apple events to target application 203 until absolutely necessary to perform the desired function.

In one embodiment, lazy evaluation is implemented by the use of references. When an object is requested from target application 203, scripting bridge 202 receives a reference to the object. Scripting bridge 202 does not evaluate the reference until application code 201 indicates that some concrete data from the requested object is needed.

For example, scripting bridge 202 does not send an Apple event when application code 201 requests the first disk of the Finder, but it does send an event when application code 201 requests the name of the first disk of the Finder. The following code provides an illustrative example:

```
    // Get the shared FinderApplication instance
    FinderApplication *finder = [FinderApplicationClass alloc]
init];
    // Get a reference which represents every disk of the
Finder (doesn't send an Apple event)
    SBElementArray *disks = [finder disks];
    // Get a reference to the first disk of the Finder (doesn't
send an Apple event)
    FinderDisk *firstDisk = [disks objectAtIndex:0];
    // Evaluate the firstDisk reference by sending it an Apple
event requesting its name
    NSString *name = [firstDisk name];
    NSLog(name); // Log the name of the first disk
```

The developer can override this behavior and force immediate evaluation of an object by using the SBObject-get method.

Lazy evaluation has the ability to dramatically reduce the number of Apple events that need to be sent, and thereby allow the application to run significantly faster. In one embodiment, an optimized array handling method is provided in SBElementArray: arrayByApplyingSelector. This method sends a single Apple event to handle the array, so as to further improve efficiency when performing functions on arrays.

In one embodiment, if target application 203 is not open when scripting bridge 202 tries to send it an Apple event 213, scripting bridge 202 automatically launches target application 203. Since this may result in undesired behavior, a check may be made to determine whether target application 203 is running before scripting bridge 202 tries to communicate with it.

In one embodiment, scripting bridge 202 uses the references described in Appendix A.

Creating Singleton Methods

In one embodiment, dynamic method generation is used to create singleton methods that run without any branch logic, so as to improve speed and efficiency. Singleton objects, or first-invocation-initializes, are a coding pattern wherein an object type has exactly one shared instance. Conventionally, singleton objects are generated by creating a class with a method that creates a new instance of the class if one does not exist. If an instance already exists, the method returns a reference to that object. Accordingly, conventional techniques for singleton methods involve the use of conditional logic and a global variable, as follows:

```
+ sharedInstance
{
    static s = nil;
    if (s == nil) {
        s = createSingleton( );
    }
    return s;
}
```

In this example, if "s" does not yet exist, it is allocated and stored in a global variable; the global variable is then returned. This conditional logic makes singleton object generation somewhat inefficient according to prior art techniques. Use of a global variable can also add inefficiency.

Real world, modern, implementations often have a significantly more complex initialization pattern and also require the use of some kind of exclusion protocol, such as locks, to support threaded runtime environments. Thus, the following structure might be used:

```
+ sharedInstance
{
    static s = nil;
    ... lock ...
    ... set up exception handler ...
    if (s == nil) {
        s = createSingleton( );
    }
    ... finally ...
        ... unlock ...
    ... end finally
    return s;
}
```

Alternatively, some complex initialization infrastructure might be invoked prior to normal program operation. Such operations are often unreliable.

In one embodiment, the present invention provides a solution by implementing such a method with full locking, exception handling, and any other correctness verifying measures and with one additional step wherein the method that retrieves the singleton is replaced with a new implementation that carries the singleton as a part of the implementation, as follows:

```
+ sharedInstance
{
    static id s;
    ... lock ...
    if (s) return s;
    ... set up exception handler ...
    id s = createSingleton( );
    ... replace +sharedInstance implementation with optimal, non-locking,
    version that simply returns 's' directly ...
    ... finally ...
        ... unlock ...
    ... end finally
    return s;
}
```

During initialization, any other callers will block on the lock operation until initialization is done. Once the lock is unlocked, any blocked callers will short circuit out on the if(s) statement (unlocking in the . . . finally . . . block), but all future callers will execute the faster replacement implementation. The replaced code is simply:

```
+ sharedInstance
{
    return s;
}
```

An example of code for implementing the above is:

```
+ (id) getSingleton
{
    local s = makeThing( );
    IMP method_implementation =
 makeImplementationReturningConstantObject(s);
        class_addMethod([self class], @selector(getSingleton),
 method_implementation);
        return s;
}
```

The first time through, the method allocates s and creates a new method implementation to return that object. It then replaces itself with that new method. This new method works without any conditional logic at all. This saves time, and also avoids the use of the global variable access. It also allows the creation of the singleton to be fully thread-safe and completely protected. A further advantage is that the retrieval of the singleton after first execution does not require any locks, exception handling, or concurrency constructs.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a de-sired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Appendix A: Class and Protocol References

SBApplication Class Reference

Inherits from            SBObject

Conforms to              NSObject (NSObject)

Framework

/System/Library/Frameworks/ScriptingBridge.framework

Availability             Available in Mac OS v10.5 and later

Declared in              Scripting Bridge/SBApplication.h

Class Description

The `SBApplication` class provides a mechanism for sending and receiving Apple events from a scriptable external application. `SBApplication` also bridges data types between Apple event descriptors and Cocoa objects.

`SBApplication` provides methods for manually sending and processing

Apple events, but you should never have to call these methods directly. Instead, subclasses of `SBApplication` implement application-specific methods that handle the sending of Apple events automatically.

For example, if you wanted to get the current iTunes® track, you can simply use the `currentTrack` method of the `iTunesApplication` subclass—which handles the details of sending the Apple event for you—rather than figuring out the more complicated, low-level alternative:

```
[iTunes propertyWithCode:'pTrk'];
```

If you do need to send Apple events manually, consider using `NSAppleEventDescriptor`.

Subclassing Notes

You rarely instantiate `SBApplication` objects directly. Instead, you get the shared instance of a subclass (such as `iTunesApplication`) by using the `+application` method.

For additional detail on generating `SBApplication` subclasses, see previous information in this Release Note.

Methods by Task

Constructors

+ classForApplicationWithBundleIdentifier:

+ classForApplicationWithURL:

+ classForApplicationWithPID:

- init

- initWithBundleIdentifier:

- initWithURL:

- initWithPID:

Getting and setting application status

- activate

- isRunning

Setting Apple event preferences

- launchFlags

- setLaunchFlags:

- sendMode

- setSendMode:

- timeout

- setTimeout:

Setting the delegate

- setDelegate:

- delegate

Translating four-character codes

- classForCodeDictionary

- codeForPropertyNameDictionary

Instance Methods activate

Brings the external application of the receiver to the front of the display.

- (void) activate

Discussion

If the external application is not already running, this method will launch it.

Availability

Available in Mac OS X v10.5 and later.

classForApplicationWithBundleIdentifier:

Returns an SBApplication subclass for the external application with the given bundle identifier.

- (Class) classForApplicationWithBundleIdentifier:(NSString *)ident

Parameters ident

The bundle identifier of the external application.

Return Value

An `SBApplication` subclass that will communicate with the external application whose bundle identifier is ident. Returns `Nil` if no such application can be found.

Discussion

Once you have the class, you may call `+alloc` and `-init` to create an instance of it. The `-init` method will locate the application using the same bundle identifier.

Some applications declare themselves to have a dynamic scripting interface; for such applications, this method will launch the application if it is not already running.

Availability

Available in Mac OS X v10.5 and later.

classForApplicationWithPID:

Returns an `SBApplication` subclass for the external application with the given process ID.

```
- (Class) classForApplicationWithPID:(pid_t)pid
```

Parameters pid

The Unix process ID of the external application.

Return Value

An initialized `SBApplication` that will communicate with the external application with process ID pid. Returns `nil` if no running process has ID pid.

Discussion

Once you have the class, you may call `+alloc` and `-init` to create an instance of it. The `-init` method will locate the application using the same process ID.

You should avoid using this method unless you know nothing about an external application but its PID. In most cases, it is better to use `classForApplicationWithBundleIdentifier:`, which will dynamically locate the external application's path at runtime, or `classForApplicationWithURL:`, which is not dependent on the external application being open at the time the method is called.

Availability

Available in Mac OS X v10.5 and later.

classForApplicationWithURL:

Returns an `SBApplication` subclass for the external application with the given URL.

- (Class) classForApplicationWithURL:(NSURL *)url

Parameters url

The URL of the external application.

Return Value

An initialized `SBApplication` that will communicate with the external application at `url`. Returns `nil` if `url` is not a valid URL.

Discussion

Once you have the class, you may call `+alloc` and `-init` to create an instance of it. The `-init` method will locate the application using the same URL.

Some applications declare themselves to have a dynamic scripting interface; for such applications, this method will launch the application if it is not already running.

This method of initializing `SBApplication` objects should be used only if you know for certain the URL of the external application. In most cases, it is better to use `initWithBundleIdentifier:`, which will dynamically locate the external application at runtime.

This method currently supports file URLs (`file:`) and remote application

URLs (`eppc:`). It does not check whether an application actually exists with the given file URL.

Availability

Available in Mac OS X v10.5 and later.

classNamesForCodes

Returns a dictionary mapping four-character class codes to the names of their corresponding Objective-C classes.

```
- (NSDictionary *) classNamesForCodes
```

Return Value

A dictionary whose keys are four-character class codes of the external application (as `NSNumbers`), and whose values are the names of the corresponding `SBObject` subclasses.

Discussion

`SBApplication`'s implementation returns an empty dictionary. Application-specific subclasses return dictionaries tailored to the types of objects they support. (For additional detail on application-specific subclasses, see previous information in this Release Note.)

You should never call this method directly.

Availability

Available in Mac OS X v10.5 and later.

See Also

```
- codesForPropertyNames:
``` codesForPropertyNames

Returns a dictionary mapping property keys to their corresponding four-character codes.

```
- (NSDictionary *) codesForPropertyNames
```

Return Value

A dictionary whose keys are the keys of properties of the external application, and whose values are the corresponding four-character codes as `NSNumber`s.

Discussion

`SBApplication`'s implementation returns an empty dictionary. Application-specific subclasses return dictionaries tailored to their properties. (For additional information on application-specific subclasses, see previous information in this Release Note.)

You should never call this method directly.

Availability

Available in Mac OS X v10.5 and later.

See Also

```
- classForCodeDictionary:
``` delegate

Returns the receiver's error handling delegate.

```
- (id) delegate
```

Return Value

The receiver's error handling delegate.

Availability

Available in Mac OS X v10.5 and later.

See Also

```
- setDelegate:

- eventDidFail:withError: (SBApplicationDelegate)
``` init

Returns an `SBApplication` instance for an external application.

```
- (id) init
```

Return Value

An initialized `SBApplication` that will communicate with the external application described by the class.

Discussion

Because this method relies on information stored in the class to locate the application, it is only usable with a subclass of `SBApplication` returned by one of the `classForApplicationWith...:` methods.

Availability

Available in Mac OS X v10.5 and later.

initWithBundleIdentifier:

Returns an `SBApplication` instance for the external application with the given bundle identifier.

```
- (id) initWithBundleIdentifier:(NSString *)ident
```

Parameters ident

The bundle identifier of the external application.

Return Value

An initialized `SBApplication` that will communicate with the external application whose bundle identifier is ident.

Discussion

If you must initialize an `SBApplication` manually, you should use this method, because it is not dependent on changeable factors such as the external application's path or process ID. Even so, you should rarely have to initialize an `SBApplication` yourself; instead, you should initialize an application-specific subclass such as `iTunesApplication`.

Note that this method does not check whether an application with the given bundle identifier actually exists.

Availability

Available in Mac OS X v10.5 and later.

initWithPID:

Returns an `SBApplication` instance for the external application with the given process ID.

```
- (id) initWithPID:(pid_t)pid
```

Parameters pid

The Unix process ID of the external application.

Return Value

An initialized `SBApplication` that will communicate with the external application with process ID pid. Returns `nil` if no running process has ID pid.

Discussion

You should avoid using this method unless you know nothing about an external application but its PID. In most cases, it is better to use `initWithBundleIdentifier:`, which will dynamically locate the external application's path at runtime, or `initWithURL:`, which is not dependent on the external application being open at the time the method is called.

Availability

Available in Mac OS X v10.5 and later.

initWithURL:

Returns an `SBApplication` instance for the external application with the given URL.

- (id) initWithURL:(NSURL *)url

Parameters url

The URL of the external application.

Return Value

An initialized `SBApplication` that will communicate with the external application at `url`. Returns `nil` if `url` is not a valid URL.

Discussion

This method of initializing `SBApplication` objects should be used only if you know for certain the URL of the external application. In most cases, it is better to use `initWithBundleIdentifier:`, which will dynamically locate the external application's path at runtime. Even so, you should rarely have to initialize an `SBApplication` yourself.

This method currently supports file URLs (`file:`) and remote application URLs (`eppc:`). It does not check whether an application actually exists with the given file URL.

Availability

Available in Mac OS X v10.5 and later.

isRunning

Returns whether the receiver is running.

```
- (BOOL) isRunning
```

Return Value

`YES` if the receiver is running, `NO` otherwise.

Availability

Available in Mac OS X v10.5 and later.

launchFlags

Returns the receiver's launch flags.

- (LSLaunchFlags) launchFlags

Return Value

A mask specifying the launch flags that will be used when the external application is launched. For more information, see Launch Services Reference.

Availability

Available in Mac OS X v10.5 and later.

See Also

- setLaunchFlags:

sendMode

Returns the mode for sending Apple events to the external application.

- (AESendMode) sendMode

Return Value

A mask specifying the mode for sending Apple events to the external application. For more information, see Apple event Manager Reference.

Availability

Available in Mac OS X v10.5 and later.

See Also

- `setSendMode:` setDelegate:

Sets the receiver's error-handling delegate.

- `(void) setDelegate:(id)delegate`

Parameters delegate

The object that should be notified of Apple event errors.

Discussion

The delegate should implement the `SBApplicationDelegate` protocol.

Availability

Available in Mac OS X v10.5 and later.

See Also

- `delegate`

- `eventDidFail:withError:` (`SBApplicationDelegate`)

setLaunchFlags:

Sets the receiver's launch flags.

```
- (void) setLaunchFlags:(LSLaunchFlags)flags
```

Parameters flags

A mask specifying the launch flags the receiver should use when launching the external application. For a list of valid options, see Launch Services Reference.

Discussion

By default, `SBApplication`'s launch flags are `kLSLaunchDontAddToRecents` (so the external application is not added to the ☐->Recent Items menu), `kLSLaunchDontSwitch` (so the external application launches in the background), and `kLSLaunchAndHide` (so the external application is hidden as soon as it is launched).

Availability

Available in Mac OS X v10.5 and later.

See Also

```
- launchFlags
``` setSendMode:

Sets the receiver's mode for sending Apple events to the external application.

```
- (void) setSendMode:(AESendMode)sendMode
```

Parameters sendMode

A mask specifying the mode for sending Apple events to the external application. For a list of valid options, see Apple event Manager Reference.

Discussion

By default, `SBApplication`'s send mode is `kAEWaitReply`. If sendMode does not specify `kAEWaitReply`, the receiver may not handle reply events correctly from the external application.

Availability

Available in Mac OS X v10.5 and later.

See Also

```
- sendMode
``` setTimeout:

Sets the time the receiver will wait to receive reply Apple events.

```
- (void) setTimeout:(long)timeout
```

Parameters timeout

The time, in ticks, that the receiver should wait to receive a reply Apple event from the external application before giving up.

Discussion

By default, `SBApplication`'s timeout is `kAEDefaultTimeout`, which is about a minute. If you want the receiver to wait indefinitely for reply Apple events, use `kNoTimeout`. For more information, see Apple event Manager Reference.

Availability

Available in Mac OS X v10.5 and later.

See Also

```
- timeout
``` timeout

Returns the time the receiver will wait to receive reply Apple events.

```
- (long) timeout
```

Return Value

The time, in ticks, that the receiver will wait to receive a reply Apple event from the external application before giving up. For more information, see Apple event Manager Reference.

Availability

Available in Mac OS X v10.5 and later.

See Also

- `setTimeout:`

SBElementArray Class Reference

| | |
|---|---|
| Inherits from | NSMutableArray : NSArray : NSObject |
| Conforms to | NSCoding (NSArray) |
| | NSCopying (NSArray) |
| | NSMutableCopying (NSArray) |
| | NSObject (NSObject) |

Framework

/System/Library/Frameworks/ScriptingBridge.framework

| | |
|---|---|
| Availability | Available in Mac OS v10.5 and later |
| Declared in | Scripting Bridge/SBElementArray.h |

Class Description

SBElementArray is an NSMutableArray subclass for dealing with groups of related SBObjects. For example, when you ask the Finder for a list of disks, or ask iTunes® for a list of playlists, you get the result back as an SBElementArray.

`SBElementArray` defines methods beyond those of `NSArray` for obtaining individual objects. Besides `objectAtIndex:`, `SBElementArray` also defines `objectWithName:` and `objectWithID:`.

Subclassing Notes

The `SBElementArray` class is not designed for subclassing.

Methods by Task

Creating an array

- `arrayByPerformingSelector:`
- `arrayByPerformingSelector:withObject:`

Getting elements of the array

- `objectWithName:`
- `objectWithID:`
- `objectAtLocation:`

Accessors

- `get`

Instance Methods arrayByPerformingSelector:

Returns a new array containing the results of sending the specified message to each object in the receiver.

```
- (NSArray *) arrayByPerformingSelector:(SEL)aSelector
```

Return Value

A new array containing the results of sending the `aSelector` message to each object in the receiver, starting with the first object and continuing through the array to the last object.

Discussion

The `aSelector` method must not take any arguments, and must return an Objective-C object. It should not have the side effect of modifying the receiving array. The order of the items in the result array corresponds to the order of the items in the original array.

Availability

Available in Mac OS X v10.5 and later.

arrayByPerformingSelector:

Returns a new array containing the results of sending the specified message to each object in the receiver.

```
- (NSArray *) arrayByPerformingSelector:(SEL)aSelector
```

`withObject:(id)argument`

Return Value

A new array containing the results of sending the `aSelector` message with the `argument` parameter to each object in the receiver, starting with the first object and continuing through the array to the last object.

Discussion

The `aSelector` method must take exactly one argument, and must return an Objective-C object. It should not have the side effect of modifying the receiving array. The order of the items in the result array corresponds to the order of the items in the original array.

Availability

Available in Mac OS X v10.5 and later.

get

Sends the receiver a `kAEGetData` Apple event.

`- (NSArray *) get`

Return Value

The result of the `kAEGetData` Apple event. In most cases, this will be a `NSArray` of `SBObject`s.

Discussion

This method is used to override `SBObject`'s reference-based approach to objects. See previous information in this Release Note for additional detail on how `SBObject` deals with object references.

Availability

Available in Mac OS X v10.5 and later.

objectAtLocation:

Returns the object at the given location.

```
- (id) objectAtLocation:(id)location
```

Parameters location

The location of one of the receiver's objects.

Return Value

The identified object.

Discussion

This method is a generalization of `objectAtIndex:` for applications where the "index" is not simply an integer. For example, Finder can specify objects using a `NSURL` as a location.

Availability

Available in Mac OS X v10.5 and later.

See Also

- objectWithName:

- objectWithID:

- objectAtIndex: (NSArray)

objectWithID:

Returns the object with the given identifier.

- (id) objectWithID:(id)identifier

Parameters identifier

The identifier of one of the receiver's objects.

Return Value

The identified object.

Discussion

This method is provided as an alternative to objectAtIndex: for applications where "index" is a meaningless concept. For example, it may be more useful to identify a contact in Address Book by its identifier (which doesn't change over time) than by its index in the list of contacts (which can change as contacts are added or removed).

Availability

Available in Mac OS X v10.5 and later.

See Also

- objectWithName:

- objectAtLocation:

- objectAtIndex: (NSArray)

objectWithName:

Returns the object with the given name.

- (id) objectWithName:(NSString *)name

Parameters name

The name of one of the receiver's objects.

Return Value

The named object.

Discussion

This method is provided as an alternative to objectAtIndex: for applications where "index" is a meaningless concept. For example, it is typically more useful to identify a mailbox in Mail by its name than by its index in the list of mailboxes.

Availability

Available in Mac OS X v10.5 and later.

See Also

- objectWithID:

- objectAtLocation:

- objectAtIndex: (NSArray)

SBObject Class Reference

| | |
|---|---|
| Inherits from | NSObject |

| | |
|---|---|
| Conforms to | NSObject (NSObject) |

Framework

/System/Library/Frameworks/ScriptingBridge.framework

| | |
|---|---|
| Availability | Available in Mac OS v10.5 and later |

| | |
|---|---|
| Declared in | Scripting Bridge/SBObject.h |

Class Description

SBObject defines methods you can send to any object in any scriptable application. It defines methods for getting elements and properties of an object, as well as setting the object to a new value.

Each SBObject is built around an object specifier, which tells Scripting Bridge how to locate the object. Therefore, you can think of an SBObject as a reference to an object in an external app, rather than an object itself. To bypass this reference-based approach, use the `get` method.

Subclassing Notes

Typically, rather than create `SBObject` instances manually, you receive `SBObject` instances by calling methods of an `SBApplication` subclass.

For example, if you wanted to get an `SBObject` representing the current iTunes® track, you would use code like this (where `iTunesTrack` is a subclass of `SBObject`):

```
iTunesApplication *iTunes = [[iTunesApplicationClass alloc] init];
iTunesTrack *track = [iTunes currentTrack];
```

For additional detail on generating application-specific `SBObject`s subclasses such as `iTunesTrack`, see previous information in this Release Note.

Methods by Task

Constructors

- `init:`
- `initWithData:`
- `initWithProperties:`

Getting elements and properties

- propertyWithCode:

- propertyWithClass:code:

- elementArrayWithCode:

Accessors

- get

- setTo:

Invoking commands

- sendEvent:id:parameters:

Instance Methods elementArrayWithCode:

Returns an array containing every child of the receiver with the given four character code.

- (SBElementArray *) elementArrayWithCode:(DescType)code

Parameters code

A four character code that represents one of the receiver's child classes.

Return Value

An `SBElementArray` containing every child of the receiver whose class matches code.

Discussion

`SBObject` subclasses use this method to implement application-specific property accessor methods. You should not need to call this method directly.

Availability

Available in Mac OS X v10.5 and later.

get

Sends the receiver a `kAEGetData` Apple event.

```
- (id) get
```

Return Value

A Cocoa object representing the result of sending the `kAEGetData` Apple event.

Discussion

This method is used to override `SBObject`'s reference-based approach to objects. See previous information in this Release Note for additional detail on how `SBObject` deals with object references.

Availability

Available in Mac OS X v10.5 and later.

init:

Returns a new `SBObject`.

- (id) init

Return Value

An `SBObject` instance.

Discussion

Until you add the resulting `SBObject` to an `SBElementArray`, no actual object will be created in the external application.

Availability

Available in Mac OS X v10.5 and later.

See Also

- initWithData:

- initWithProperties:

initWithData:

Returns an `SBObject` containing the given data.

- (id) initWithData:(id)data

Parameters data

An object containing data for the new `SBObject`.

Return Value

An `SBObject` containing data.

Discussion

Until you add the resulting `SBObject` to an `SBElementArray`, no actual object will be created in the external application.

Availability

Available in Mac OS X v10.5 and later.

See Also

```
- initWithProperties:
``` initWithProperties:

Returns an `SBObject` containing properties from the given dictionary.

```
- (id) initWithProperties:(NSDictionary *)properties
```

Parameters properties

A dictionary with keys specifying the names of properties to set, and values specifying the data for those properties.

Return Value

An `SBObject` matching properties.

Discussion

Until you add the resulting `SBObject` to an `SBElementArray`, no actual object will be created in the external application.

Availability

Available in Mac OS X v10.5 and later.

See Also

- initWithData:

propertyWithClass:code:

Returns an object of the given class representing the given property of the receiver.

```
- (SBObject *)propertyWithClass:(Class)cls
code:(AEKeyword)code
```

Parameters cls

The `SBObject` subclass to instantiate.

code

A four character code that represents a property of the receiver.

Return Value

An instance of cls representing the receiver's code property.

Discussion

SBObject subclasses use this method to implement application-specific property accessor methods. You should not need to call this method directly.

Availability

Available in Mac OS X v10.5 and later.

See Also

− propertyWithCode:

propertyWithCode:

Returns an object representing the given property of the receiver.

− (SBObject *)propertyWithCode:(AEKeyword)code

Parameters code

A four character code that represents a property of the receiver.

Return Value

An object representing the receiver's code property.

Discussion

SBObject subclasses use this method to implement application-specific property accessor methods. You should not need to call this method directly.

Availability

Available in Mac OS X v10.5 and later.

See Also

- propertyWithClass:code:

setTo:

Sends the receiver a kAESetData Apple event with the given object.

- (void)setTo:(id)value

Parameters value

The data the receiver should be set to. value can be an NSString, NSNumber, NSArray, SBObject, or any other kind of object supported by the Scripting Bridge framework.

Discussion

You should not need to call this method directly.

Availability

Available in Mac OS X v10.5 and later.

sendEvent:id:parameters:

Sends an Apple event to the external application with the given event class, event ID, and format

```
- (id)sendEvent:(AEEventClass)eventClass
id:(AEEventID)eventID parameters:(DescType)firstParamCode, ...
```

Parameters eventClass

The event class of the Apple event to be sent.

eventID

The event ID of the Apple event to be sent.

firstParamCode...

A nil-terminated list of parameter four character codes () and object values ().

Return Value

The external application's reply Apple event, turned into a Cocoa object.

Discussion

This method is used to communicate with external applications. If the external application replies to this method with an error Apple event, the receiver will call its delegate's `eventDidFail:withError:` method. if no delegate exists, the receiver will raise an exception.

You should rarely have to call this method directly.

Availability

Available in Mac OS X v10.5 and later.

See Also

- `delegate (SBApplication)`

- `eventDidFail:withError: (SBApplicationDelegate)`

SBApplicationDelegate Protocol Reference (informal protocol)

Framework

/System/Library/Frameworks/ScriptingBridge.framework

Declared in                  Scripting Bridge/SBApplication.h

Protocol Description

This informal protocol defines delegate methods for handling Apple event errors that are sent from an external application to an SBApplication object.

Methods by Task

Handling errors

```
- eventDidFail:withError:
```

Instance Methods eventDidFail:withError:

Sent by an SBApplication when its external application returns an error Apple event.

```
- (void)eventDidFail:(const AppleEvent *)event withError:(NSError *)error
```

Parameters event

A pointer to the Apple event sent to the external application.

error

An object containing information from the error reply. See Constants for a list of possible keys in the userInfo dictionary for error.

Availability

Available in Mac OS X v10.0 and later.

Constants

The following table describes possible keys for the userInfo dictionary of the NSError object passed to the delegate.

| Key | Value |
| --- | --- |
| @"ErrorBriefMessage" | A short human-readble description of the error, as an NSString ob- |

| | |
|---|---|
| | ject. |
| @"ErrorExpectedType" | The type of data the external application expected, as an `NSAppleEventDescriptor` object. |
| @"ErrorOffendingObject" | The object that caused the error. |
| @"ErrorString" | A full human-readable description of the error, as an `NSString` object. |
| @"ErrorNumber" | The Apple event error number, as an `NSNumber` object. |
| | |

Note that for some errors, the `userInfo` dictionary may not have any of these keys.

What is claimed is:

1. At a computer system, the computer system including a scripting bridge for translating between scriptable applications and other types of applications, a computer-implemented method for controlling a target scriptable application, comprising:
   the scripting bridge retrieving a scripting interface for the target scriptable application from a dictionary associated with the target scriptable application;
   the scripting bridge generating at least one class based on the scripting interface, the at least one class facilitating access to scripting commands for the target scriptable application; and
   providing the generated at least one class to a code environment for application code to facilitate issuing scripting commands to the target scriptable application from directly within the application code, the application code being one of the other types of applications.

2. The method of claim 1, further comprising:
   the scripting bridge receiving a method call from the application code, the method call indicating a class previously generated by the scripting bridge; and
   responsive to receiving the method call:
      translating the method call into a call for use at the target scriptable application in accordance with the scripting interface; and
      issuing the call for use at the target scriptable application to the target scriptable application.

3. The method of claim 2, wherein issuing the call to the target scriptable application comprises issuing a scripted operation to the target scriptable application.

4. The method of claim 2, wherein issuing the call to the target scriptable application comprises issuing an Apple event to the target scriptable application.

5. The method as recited in claim 2, wherein receiving a method call from the application code comprises receiving a method call from the application code, the method call specifying an operation to be performed at the target scriptable application.

6. The method as recited in claim 2, wherein issuing the call for use at the target scriptable application comprises issuing an event to the target scriptable application, the event issued in accordance with an event protocol compatible with the target scriptable application.

7. The method as recited in claim 2, wherein generating at least one class based on the scripting interface comprises mapping class and command definitions contained in the scripting interface to class and method definitions in Objective-C.

8. The method as recited in claim 7, wherein translating the method call into a call for use at the target scriptable application comprises using a call from the runtime system of the application code to synthesize an actual implementation for a scripted operation based on the mappings.

9. The method of claim 1, wherein the application code comprises at least one of: an Objective C application, a Ruby application, and a Python application.

10. The method of claim 1, wherein generating at least one class is performed at run-time.

11. The method of claim 1, wherein generating at least one class is performed at build-time.

12. The method as recited in claim 11, further comprising generating at least one header file, the at least one header file including declarations for the at least one class; and
   providing the at least one header file to the application code.

13. The method of claim 1, wherein issuing the call to the target scriptable application is performed responsive to an indication that actual data is needed from the target application.

14. The method as recited in claim 1, wherein the application code comprises at least one of: compiled code and interpreted code.

15. The method as recited in claim 1, wherein generating at least one class based on the scripting interface comprises generating glue code for invoking scripts to control the target scriptable application.

16. The method as recited in claim 1, wherein generating at least one class based on the scripting interface comprises generating a singleton method.

17. A computer program product for use at a computer system, the computer system including a scripting bridge for translating between scriptable applications and other types of applications, the computer program product for implementing a method for controlling a target scriptable application, comprising:
   a non-transitory computer-readable storage medium; and
   computer program code, encoded on the medium, that when executed by a processor causes the scripting bridge to perform the method, including the steps of:
      retrieving a scripting interface for the target scriptable application from a dictionary associated with the target scriptable application;
      generating at least one class based on the scripting interface, the at least one class facilitating access to scripting commands for the target scriptable application; and
      providing the generated at least one class to a code environment for application code to facilitate issuing scripting commands to the target scriptable application from directly within the application code, the application code being one of the other types of applications.

18. The computer program product of claim 17, further comprising computer program code that when executed causes the scripting bridge to perform the steps of:
   receiving a method call from the application code, the method call indicating a class previously generated by the scripting bridge; and
   responsive to receiving the method call:
      translating the method call into a call for use at the target scriptable application in accordance with the scripting interface; and
      issuing the call for use at the target scriptable application to the target scriptable application.

19. The computer program product of claim 18, wherein the computer program code that when executed causes the scripting bridge to issue the call to the target scriptable application comprises computer program code that when executed causes the scripting bridge to issue a scripted operation to the target scriptable application.

20. The computer program product of claim 18, wherein the computer program code that when executed causes the scripting bridge to issue the call to the target scriptable application comprises computer program code that when executed causes the scripting bridge to issue an Apple event to the target scriptable application.

21. The computer program product as recited in claim 18, wherein the computer program code that when executed causes the scripting bridge to receive a method call from the application code comprises computer program code that when executed causes the scripting bridge to receiving a method call from the application code, the method call specifying an operation to be performed at the target scriptable application.

22. The computer program product as recited in claim 18, wherein the computer program code that when executed causes the scripting bridge to issue the call for use at the target scriptable application comprises computer program code that when executed causes the scripting bridge to issue an event to the target scriptable application, the event issued in accordance with an event protocol compatible with the target scriptable application.

23. The computer program product as recited in claim 18, wherein the computer program code that when executed causes the scripting bridge to generate at least one class based on the scripting interface comprises computer program code that when executed causes the scripting bridge to map class and command definitions contained in the scripting interface to class and method definitions in Objective-C.

24. The computer program product as recited in claim 23, wherein the computer program code that when executed causes the scripting bridge to translate the method call into a call for use at the target scriptable application comprises computer program code that when executed causes the scripting bridge to use a call from the runtime system of the application code to synthesize an actual implementation for a scripted operation based on the mappings.

25. The computer program product of claim 17, wherein the application code comprises one of: an Objective C application, a Ruby application, or a Python application.

26. The computer program product of claim 17, wherein the computer program code that when executed causes the scripting bridge to generate at least one class is executed at run-time.

27. The computer program product of claim 17, wherein the computer program code that when executed causes the scripting bridge to generate at least one class is executed at build-time.

28. The computer program product as recited in claim 27, further comprising computer program code that when executed causes the scripting bridge to perform the steps of:
generating at least one header file, the at least one header file including declarations for the at least one class; and
providing the at least one header file to the application code.

29. The computer program product of claim 17, wherein the computer program code that when executed causes the scripting bridge to issue the call to the target scriptable application is executed responsive to an indication that actual data is needed from the target scriptable application.

30. The computer program product as recited in claim 17, wherein the application code comprises at least one of: compiled code and interpreted code.

31. The computer program product as recited in claim 17, wherein the computer program code that when executed causes the scripting bridge to generate at least one class based on the scripting interface comprises computer program code that when executed causes the scripting bridge to generate glue code for invoking scripts to control the target scriptable application.

32. The computer program product as recited in claim 17, wherein the computer program code that when executed causes the scripting bridge to generate at least one class based on the scripting interface comprises computer program code that when executed causes the scripting bridge to generate a singleton method.

33. A system for controlling a target scriptable application, comprising:
at least one processor;
system memory communicatively coupled to the at least one processor;
a dictionary retrieval module for operation in connection with the at least one processor, the dictionary retrieval module configured to retrieve a scripting interface from a dictionary associated with the target scriptable application;
a class generation module for operation in connection with the at least one processor, the class generation module configured to:
generate at least one class based on the scripting interface, the at least one class facilitating access to scripting commands for the target scriptable application; and
provide the generated at least one class to a code environment for application code to facilitate issuing scripting to the target scriptable application from directly within the application code, the application code and the target scriptable application being different types of applications.

34. The system as recited in claim 33, wherein the class generation module is further configured to:
generate at least one header file, the at least one header file including declarations for the at least one class; and
provide the at least one header file to the application code.

35. The system as recited in claim 33, wherein the class generation module is configured to generate at least one class based on the scripting interface by generating glue code for invoking scripts to control the target scriptable application.

36. The system as recited in claim 33, wherein the class generation module is configured to generate at least one class based on the scripting interface by generating a singleton method.

37. The system as recited in claim 33, wherein the class generation module is configured to generate at least one class based on the scripting interface by mapping class and command definitions contained in the scripting interface to class and method definitions in Objective-C.

38. The system as recited in claim 33, wherein the class generation module is configured to generate at least one class based on the scripting interface by generating at least one class at run-time.

39. The system as recited in claim 33, wherein the class generation module is configured to generate at least one class based on the scripting interface by generating at least one class at build-time.

40. The system as recited in claim 33, wherein the application code comprises at least one of: compiled code and interpreted code.

* * * * *